March 14, 1967 J. P. BUNN 3,308,908
ENERGY ABSORBER
Filed Jan. 11, 1965
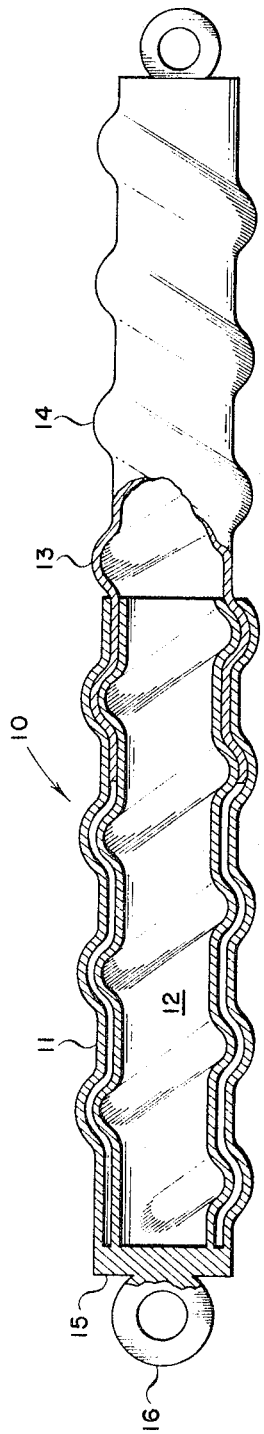
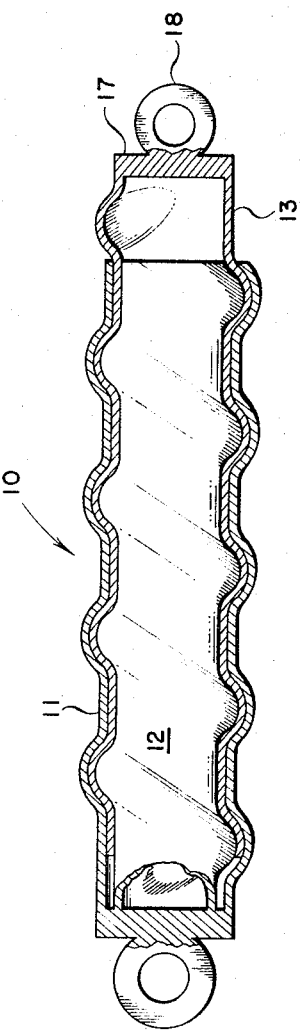
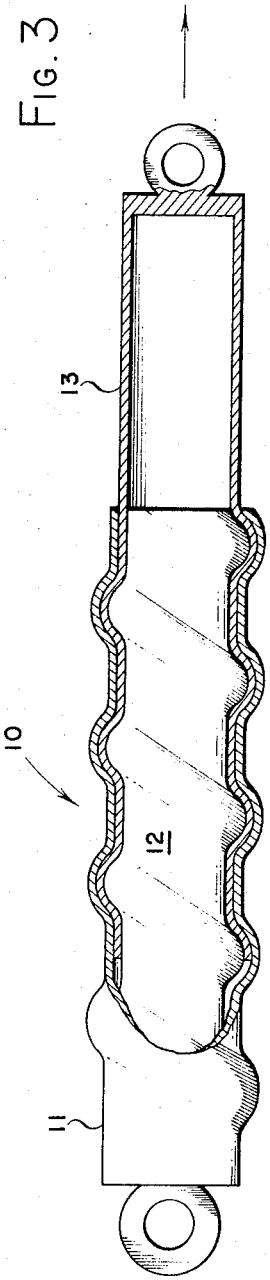
*INVENTOR.*
JOHN P. BUNN
BY *George C. Sullivan*
Agent

United States Patent Office 3,308,908
Patented Mar. 14, 1967

3,308,908
ENERGY ABSORBER
John P. Bunn, Atlanta, Ga., assignor to Lockheed Aircraft Corporation, Burbank, Calif., a corporation of California
Filed Jan. 11, 1965, Ser. No. 424,798
3 Claims. (Cl. 188—1)

This invention relates to energy absorbing devices and more particularly to such a device capable of absorbing and dissipating high energy impact loads that is adjustable both in length and load-bearing capability.

The present invention primarily contemplates cargo tie-downs; i.e., fasteners to anchor articles during shipment onboard moving vehicles, such as trucks, trains, boats, and in the extreme case, aircraft, where deceleration forces and loads due to impacts particularly those occasioned by hard landings, arrested landings, including crashes, etc., are severest. Also, with aircraft as opposed to surface traveling vehicles, stringent weight and space conditions are imposed; hence, the energy absorber herein proposed is designed, constructed and arranged to satisfy the more demanding requirements of air cargo tie-down although it is equally applicable, if not more so, for the several surface cargo applications. Its adjustable feature serves to further adapt it for general application.

In addition to absorbing a comparatively large amount of energy in a relatively small and/or restricted space, an energy absorber for the particular application under consideration must function as a rigid element or member under loads which are tolerable, i.e., below a predetermined value. If such absorber were to have elastic characteristics, recoil and rebound effects would result which could be as, or more, harmful to the cargo as the very impact loads it is intended to resist.

Energy absorbers heretofore proposed that have attempted to avoid the use of devices having elastic properties which, as pointed out above, are undesirable or which try to avoid sheer connections and hydraulics both of which are unpredictable under operating conditions including varying temperature ranges of aircraft have involved operating parts and mechanisms such as splines, gears, etc. In addition to being heavy and space-consuming, all of these prior type of absorbers tend to be unreliable due to their very complexity.

The instant invention recognizes the foregoing and other shortcomings of existing energy absorbers and proposes to overcome these by the provision of a reliable, compact and uncomplicated device. To that end, this energy absorber is so constructed and arranged that it acts as a rigid link between the cargo and the vehicle under normal or safe loads below the predetermined impact value. Only when the predetermined value is exceeded does this device function as an energy absorber to prevent the force or load from being transmitted to the cargo. In this operation such load is absorbed directly into the device with no rebound effects since it has virtually no elastic properties.

At the same time, this energy absorber is devoid of operating parts whereby it is not prone to premature operation due to environmental conditions such as temperature, vibrations, and the like. When a load of a magnitude exceeding the predetermined value of its setting is applied, the device operates immediately and reliably at a uniform rate in direct proportion to the magnitude of the load. Once operated the device is in large measure reusable only an insignificant portion thereof having been deformed by the load absorbed.

More specifically, the energy absorber as herein proposed comprises a plurality of tubes each fabricated of rigid material and the several tubes adapted for assembly in coaxial, telescopic relation. The walls of the several tubes are each formed or otherwise provided with complemental deformations and at least one of the tubes is unconnected from the others whereby the relative location of its deformations with those of the other tubes established the effective length of the assembly. Moreover, the depth of these deformations is such that an engagement of predetermined strength resisting separation of the tubes by applied tension forces is established.

The material of the unconnected and relatively movable tube is one having a yield point below that of the other tubes so that tensile forces applied at opposite ends of the assembly exceeding the resistive strength of the assembly as established by the relative yield points of the tubes together with the geometry of the deformations forcibly extends the assembly. Such forced extension serves to absorb within the assembly the energy that would otherwise be transmitted from one end of the assembly to the other.

With the above and other objects in view was will be apparent this invention consists in the construction, combination and arrangement of parts all as hereinafter more clearly described, claimed and illustrated in the accompanying drawings wherein:

FIGURE 1 is a longitudinal view, partly in section, of an energy absorber constructed and arranged in accordance with the teachings of this invention showing the tube assembly in a position of adjustment adjacent one extreme;

FIGURE 2 is a similar view thereof in another position of adjustment adjacent the other extreme; and FIGURE 3 is a similar view thereof after the yield point of the tube assembly has been exceeded and the relatively movable tube thereof has been forcibly extended.

Referring more particularly to the drawings and the preferred embodiment of the invention illustrated therein, the numeral 10 designates an energy absorber. Such absorber 10 consists of three tubes 11, 12 and 13 mated to each other by means of and through a rolled thread 14 formed in the respective walls thereof whereby the several tubes are coaxially disposed in an assembly. The tubes 11 and 12 being spaced one from the other form the outer and inner walls of the assembly and are each closed at one corresponding end by an integral base wall 15. For this purpose the adjacent surfaces of the walls of the tubes 11 and 12 may be placed in abutment and secured one to the other in any conventional manner to constitute in effect a unitary structure. An anchor attachment such as a ring or loop 16 is secured as by welding, brazing, fusing or the like to the outer surface of the wall 15 to project therefrom in the axial plane.

The space defined by the tubes 11 and 12 is substantially equal in transverse dimension to the thickness of the tube 13 which is thus sandwiched therebetween to form the inner core of the assembly. The tube 13 is engaged with the tubes 11 and 12 only through the thread 14. At its outer end the tube 13 is closed by an integral base wall 17 to the outer surface of which is secured by welding, brazing, fusing, etc., an anchor attachment such as a ring or loop 18 equivalent in all respects to the ring 16.

The tubes 11 and 12 are fabricated of a relatively heavy gage hard material, preferably steel, while the inner tube 13 is fabricated of a lighter gage material with a yield point appreciably below that of the tubes 11 and 12. In the preferred formed tube 13 is aluminum. The deformation or depth of the thread 14 is such that the tube 13 is stressed just beyond its yield point.

The assembly 10 is completed and adjusted to the desired length and load capacity by twisting or screwing tube 13 a predetermined or calibrated distance into the space between the tubes 11 and 12 where it will resist tension loads to a predictable point. Beyond this point the tube 13 begins to extrude out from between the tubes 11 and 12 without rotating. At this time the assembly 10 is connected through its respective end attachments 16 and 18 to the cargo and fixed structure of the vehicle. Such connections further serve to prevent the rotation of the tube 13 out of the tubes 11 and 12.

Thus, the extrusion process as above set forth forces the tube 13 to pass between the tubes 11 and 12 deforming into and out of each successive thread pitch 14. In so doing, energy is absorbed and forces that otherwise would pass between the vehicle and the cargo are dissipated by the assembly 10. Once the assembly 10 has been forced, the tube 13 is discarded but the remainder of the assembly is reusable requiring only the insertion of a new tube 13 for its return to service.

It should be understood, of course, that while the foregoing disclosure is directed to a preferred embodiment of the invention, numerous modifications or alterations may be made therein without departing from the spirit and scope of the invention as set forth in the appended claims.

What is claimed is:

1. An energy absorber comprising a plurality of rigid tubes assembled in overlapped relation and mated to each other by deformations in the walls thereof in the form of a helix, at least one of said tubes being unconnected from the other tubes whereby the relative rotation thereof varies the length of overlap aforesaid and being fabricated of a material having a yield point below that of said other tubes, and an attachment secured to the remote outer ends of said tubes.

2. The energy absorber of claim 1 wherein the material of said one tube is aluminum and the material of said other tubes is steel.

3. The energy absorber of claim 1 wherein three tubes are employed, said other tubes being spaced peripherally one from the other and interconnected at said outer ends and said one tube being disposed in the space aforesaid.

References Cited by the Examiner

UNITED STATES PATENTS 3,181,821   5/1965   Eddins _____ 188—1 X

DUANE A. REGER, *Primary Examiner.*